US012671663B2

(12) United States Patent
Gunjal et al.

(10) Patent No.: US 12,671,663 B2
(45) Date of Patent: Jun. 30, 2026

(54) CONVERSATIONAL COMMERCE OPTIMIZATION FOR AI-BASED VIRTUAL ASSISTANTS

(71) Applicant: Accenture Global Solutions Limited, Dublin (IE)

(72) Inventors: Satish Gunjal, Pune (IN); Manish Pasrija, Faridabad (IN); Anoop Kumar Gopinatha, Issaquah, WA (US); Himanshu Srivastava, Gurugram (IN); Elodie Perrigaud, Nanterre (FR)

(73) Assignee: Accenture Global Solutions Limited, Dublin (IE)

( * ) Notice: Subject to any disclaimer, the term of this patent is extended or adjusted under 35 U.S.C. 154(b) by 208 days.

(21) Appl. No.: 18/648,777

(22) Filed: Apr. 29, 2024

(65) Prior Publication Data

US 2025/0335928 A1    Oct. 30, 2025

(51) Int. Cl.
H04L 51/02 (2022.01)
G06F 16/242 (2019.01)

(52) U.S. Cl.
CPC .......... H04L 51/02 (2013.01); G06F 16/2425 (2019.01)

(58) Field of Classification Search
CPC ............................. H04L 51/02; G06F 16/2425
See application file for complete search history.

(56) References Cited

U.S. PATENT DOCUMENTS

| | | | | |
|---|---|---|---|---|
| 12,585,646 B2 * | 3/2026 | Lee | .................. | G06F 16/24522 |
| 2007/0143307 A1 * | 6/2007 | Bowers | ................. | G06F 16/972 |
| 2025/0141769 A1 * | 5/2025 | Li | ........................ | H04L 41/0631 |
| 2025/0307418 A1 * | 10/2025 | Spencer | ................ | G06F 21/577 |
| 2025/0322555 A1 * | 10/2025 | Agarwal | ................ | G06T 11/00 |
| 2025/0328536 A1 * | 10/2025 | Gadit | ............... | G06F 16/24578 |

* cited by examiner

*Primary Examiner* — Etienne P Leroux
(74) *Attorney, Agent, or Firm* — Seed Intellectual Property Law Group LLP

(57) ABSTRACT

Implementations of the present disclosure provide receiving, by a conversational commerce optimizer system, a user input from a user, the user input being provided to a chatbot of an e-commerce platform, providing a refined query based on the user input, selecting, by the conversational commerce optimizer system, a foundation model that is to be queried using the refined query, determining a set of search results from a database that stores data representative of products available through the e-commerce platform, prompting the foundation model using a prompt that is generated based on the refined query and the set of search results, the foundation model providing an output responsive to the prompt, and providing a response to the user through the user interface of the chatbot, the response being generated based on the output.

17 Claims, 3 Drawing Sheets

CONVERSATIONAL COMMERCE OPTIMIZATION FOR AI-BASED VIRTUAL ASSISTANTS

BACKGROUND

Enterprises deploy online systems to provision products and/or services to users. To assist in user interactions with online systems, enterprises deploy various online tools. An example online tool includes virtual assistants, commonly referred to as chatbots. In general, a chatbot can be described as an online virtual assistant that can converse with a user to provide information to and/or execute actions on behalf of the user. For example, a user can converse with a chatbot by providing input to the chatbot, to which the user responds. Such a conversation can include, for example, a chat conversation using text-to-text and/or text-to-speech, for providing assistance in the absence of a live human agent. Chatbots may also be used for guiding a user with the required information or providing suitable alternatives. Chatbots may also be used as a tool for several other purposes including, for example, an enquiry service, marketing, educational purposes, providing product-based information, routing requests, and the like. Chatbots can be used in a range of domains such as, for example, electronic commerce (e-commerce), education, entertainment, finance, health, news, and productivity.

However, traditional chatbots suffer from several drawbacks. This may be because of certain limitations of chatbots, such as, for example, limited comprehension of user queries, presenting the same response repeatedly (termed as loops), and/or providing irrelevant responses. Several other such limitations may be present in the chatbots that may lead to an unsatisfactory user experience, low efficiency of chatbot performance, and subsequent increased manual intervention. These limitations may nullify the advantages of the chatbots and limit their usage.

SUMMARY

Implementations of the present disclosure are generally directed to optimization of virtual assistants. More particularly, implementations of the present disclosure are directed to a conversational commerce optimization system that optimizes virtual assistants leveraging foundation models, such as large language models (LLMs), to provide personalized, interactive, and creative interactions with users of online systems. The conversational commerce optimization system of the present disclosure overcomes limitations of traditional virtual assistants by enabling a more engaging, human-like, and contextually relevant experience. Further, the conversational commerce optimization system of the present disclosure enables virtual assistants to overcome limitations of traditional approaches by, among other features, ensuring data privacy and mitigating incorrect and/or biased information.

In general, innovative aspects of the subject matter described in this specification can include actions of receiving, by a query refiner of a conversational commerce optimizer system, a first user input from a user, the first user input being provided during a chat session through a user interface of the chatbot of an electronic (e-commerce) platform, providing, by the query refiner, a first refined query based on the first user input, selecting, by a Generative Artificial Intelligence (GAI) selection module of the conversational commerce optimizer system, a first foundation model that is to be queried using the first refined query, determining, by the query refiner, a first set of search results from a database that stores data representative of products available through the e-commerce platform, prompting the first foundation model using a first prompt that is generated based on the first refined query and the first set of search results, the first foundation model providing a first output responsive to the first prompt, and providing a first response to the user through the user interface of the chatbot, the first response being generated based on the first output. Other implementations of this aspect include corresponding systems, apparatus, and computer programs, configured to perform the actions of the methods, encoded on computer storage devices.

These and other implementations can each optionally include one or more of the following features: the first response is provided by validating the first output and formatting the first output; the first set of search results is generated by comparing a set of user input embeddings to embeddings stored in the database; the first set of search results is provided from an initial set of search results determined based on the first refined query; actions further include receiving, by the query refiner, a second user input from the user, providing, by the query refiner, a second refined query based on the second user input, selecting, by the GAI selection module, a second foundation model that is to be queried using the second refined query, prompting the second foundation model using a second prompt that is generated based on the second refined query, the second foundation model providing a second output responsive to the second prompt, and providing a second response to the user though the user interface of the chatbot, the second response being generated based on the second output; the second refined query is provided at least partially based on the first user input; and the second prompt is provided at least partially based on the first user input and the first output.

The present disclosure also provides a non-transitory computer-readable storage medium coupled to one or more processors and having instructions stored thereon which, when executed by the one or more processors, cause the one or more processors to perform operations in accordance with implementations provided herein.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Figure 1:
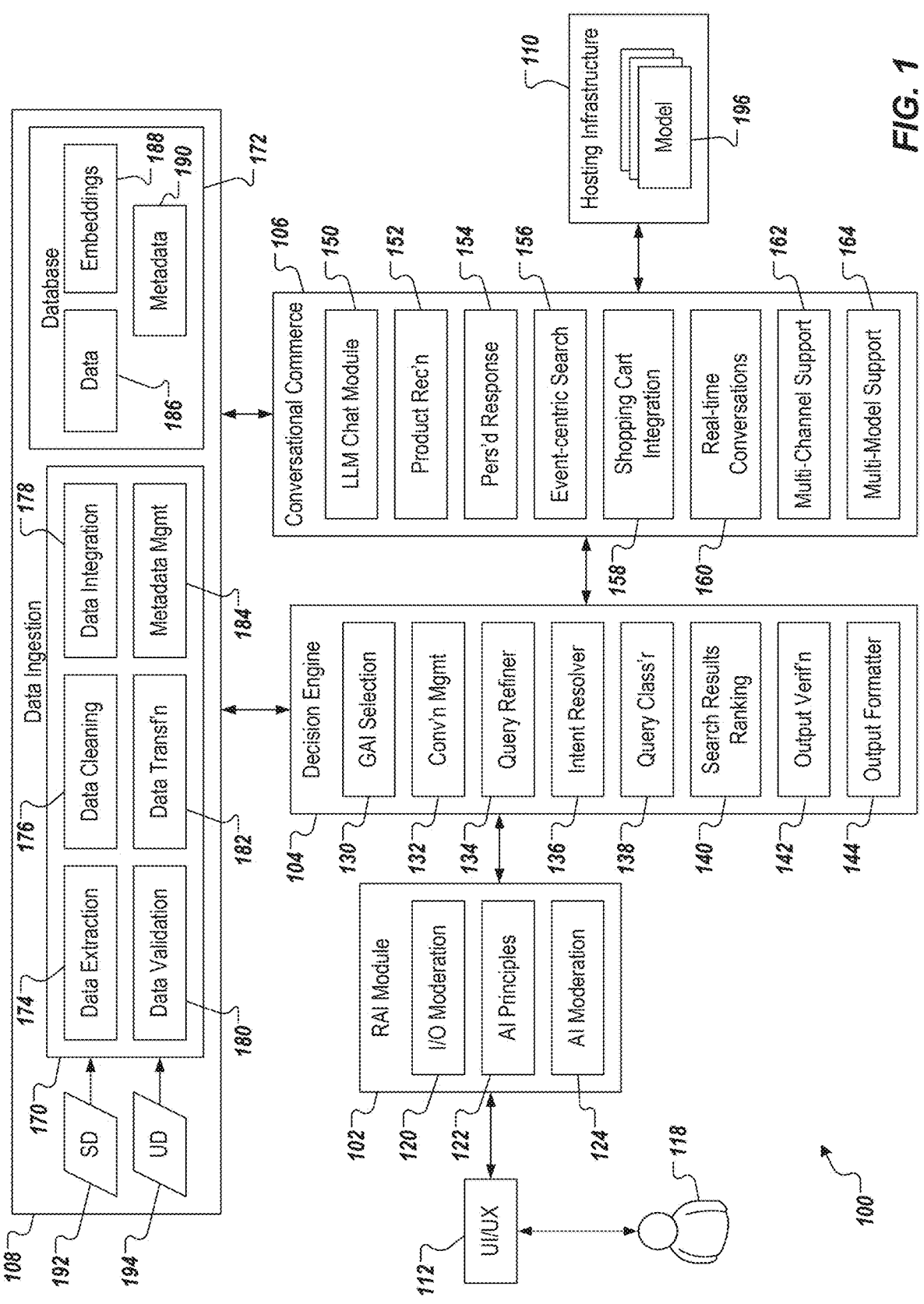
FIG. 1 depicts an example architecture for optimization of virtual assistants in accordance with implementations of the present disclosure.

Implementations of the present disclosure are generally directed to optimization of virtual assistants. More particularly, implementations of the present disclosure are directed to a conversational commerce optimization system that optimizes virtual assistants leveraging foundation models, such as large language models (LLMs), to provide personalized, interactive, and creative interactions with users of online systems. The conversational commerce optimization system of the present disclosure overcomes limitations of traditional approaches by offering a more engaging, human-like, and contextually relevant experience. Further, the conversational commerce optimization system of the present disclosure enables virtual assistants to overcome limitations of traditional approaches by, among other features, ensuring data privacy and mitigating incorrect and/or biased information.

Implementations of the present disclosure are described in further detail herein with reference to foundation models. A foundation model can be described as a general-purpose generative artificial intelligence (GAI) model, such as large deep learning neural networks, that are trained using broad range of generalized, unlabeled training data and that is capable of performing a multitude of general tasks (e.g., generating text, generating images, conversing in natural language, generating video, generating audio). While implementations of the present disclosure are described in further detail herein with non-limiting reference to LLMs as example foundation models, it is contemplated that implementations of the present disclosure can be realized using any appropriate foundation models. Example foundation models can include foundation models that generate content based on any appropriate modality (e.g., text, audio, image, video).

To provide context for implementations of the present disclosure, enterprises employ software systems to support execution of operations. For example, and as introduced above, enterprises deploy online systems to provision products and/or services to users. To assist in user interactions with online systems, enterprises deploy various online tools, such as virtual assistants, commonly referred to as chatbots. In general, a chatbot can be described as an online virtual assistant that can converse with a user to provide information to and/or execute actions on behalf of the user. In an effort to improve chatbots, machine learning (ML) is increasingly introduced. For example, ML models can be implemented to replace rule-based systems.

To further improve online tools, such as chatbots, enterprises seek to leverage GAI to address drawbacks and/or limitations of traditional chatbots. GAI can be described as a form of ML that includes so-called foundation models that generate content based on training data. For example, foundation models can include LLMs, which are a form of GAI that can be used to generate text for a variety of use cases. It can be noted that GAI can be used to generate a variety of content including, but not limited to text, images, audio, and video.

However, traditional chatbots have multiple technical issues and other drawbacks. For example, traditional chatbots fail to provide personalized, interactive, and creative experiences that can engage users. As another example, traditional chatbots can rely on predefined rules, templates, and algorithms that cannot capture the diversity and complexity of needs, preferences, and emotions of users. As another example, traditional chatbots have difficulty in generating relevant responses, recommendations, style tips, and visual inspirations that match context and intent of users. As still another example, traditional chatbots can have difficulty in handling natural language queries, complex requests, and/or ambiguous inputs from users, and can lack the ability to adapt to feedback, sentiment, and/or behavior of users. From a user experience perspective, traditional chatbots lack ability to provide engaging and customized conversations with users that can mimic human-like interactions, as well as the ability to use humor, empathy, and creativity to build rapport and trust with users.

In terms of integrating GAI, this is a non-trivial task that presents various technical challenges and can have disadvantages that have to be managed. In the context of chatbots, issues arising can include, but are not limited to, data privacy, inaccurate information, biased information, and misinformation. Further challenges include maintaining context in conversations, providing consistent and tailored responses, integrating with existing systems, and managing consumption of technical resources (e.g., processing, memory, bandwidth). Additional issues that arise include maintaining user trust and regulatory compliance, as well as handling updates and content moderation.

Further, GAI models are not specific to any particular domain and are only as up-to-date as of training. Consequently, there is a knowledge gap between GAI models and specific domains. This knowledge gap expands as data within domains changes over time (e.g., changes to data, new data) arising in a specific domain. To account for such dynamics, GAI models could be re-trained with the most-recent data. However, retraining of GAI models is time- and resource-intensive and is impractical to implement on a regular basis. Further, re-training does not resolve the issue of generality of GAI models (i.e., not trained for a specific domain).

In short, chatbots and GAI present technical challenges and multiple disadvantages that did not exist in the pre-computing, pre-Internet world. In order to effectively implement chatbots that leverage GAI, these challenges and disadvantages need to be addressed.

In view of this, implementations of the present disclosure provide a conversational commerce optimization system that optimizes chatbots leveraging foundation models, such as LLMs, to provide personalized, interactive, and creative interactions with users of online systems. To provision the conversational commerce optimization system of the present disclosure, an infrastructure is provided that can include, among other components, a responsible AI (RAI) component, a decision engine, a conversational commerce component, and a data ingestion system. As described in further detail herein, the conversational commerce optimization system of the present disclosure enables chatbots to overcome limitations of traditional approaches by offering a more engaging, human-like, and contextually relevant experience. Further, the conversational commerce optimization system of the present disclosure can enable chatbots to ensure data privacy and mitigate incorrect, biased, and/or misinformation.

As described in further detail herein, implementations of the present disclosure provide for intelligent integration of foundation models, such as LLMs, with chatbots to deliver highly personalized, context-aware, and emotionally engaging responses, improving user interactions. A GAI selection mechanism, such as Frugal GPT, optimizes foundation model selection and resource usage through a dynamic, cost-effective approach, ensuring resilience and flexibility in an ever-evolving AI landscape. Implementations of the present disclosure provide context-aware conversation management that employs advanced techniques to maintain conversational context, offering users seamless, coherent, and highly personalized interactions.

In some implementations, precision-driven query refinement is provided by harnessing AI to intelligently disambiguate and refine user queries, enhancing the overall user experience and ensuring precise, relevant responses. In some implementations, intuitive intent resolution is used to interpret and map complex, abstract user queries to pertinent products and/or services, to align functionality with needs and desires of users. In some implementations, query classification is provided by employing sophisticated categorization algorithms to improve performance of foundation models, directing computational power to generating highly relevant and targeted responses. In some implementations, advanced search result ranking is provided and utilizes ranking algorithms to curate and prioritize search results, ensuring users are presented with relevant responses to queries. In some implementations, robust output verification is provided by using rigorous quality control mechanisms to guarantee the accuracy, reliability, and relevance of AI-generated responses. Further, implementations include an output formatter that transforms AI-generated content into versatile formats for effortless integration with various platforms and devices, offering a smooth, consistent, and engaging user experience across the digital ecosystem.

As also described in further detail herein, implementations of the present disclosure use retrieval augmented generation (RAG) to augment GAI models with additional knowledge, such as domain-specific knowledge. In general, RAG can include receiving a user query, a prompt, retrieving domain-specific data that is relevant to the prompt, and using the domain-specific data as context for the query when prompting a GAI model. In this manner, domain-related knowledge gaps of the GAI models can be mitigated and responses from GAI models can include up-to-date data relevant to a respective domain.

FIG. 1 depicts an example architecture 100 for chatbot optimization in accordance with implementations of the present disclosure. In the example of FIG. 1, the example architecture 100 includes a Responsible AI (RAI) module 102, a decision engine 104, a conversational commerce module 106, a data ingestion system 108, a hosting infrastructure 110, and a user interface (UI)/user experience (UX) module 112. In some implementations, one or more components of one or more of the decision engine 104, the conversational commerce module 106, and the data ingestion system 108 can be used to provide the conversational commerce optimization system of the present disclosure. The UI/UX module 112 represents one or more interfaces, through which a user 118 can interact with a chatbot that leverages the conversational commerce optimizer of the present disclosure. For example, the UI/UX module 112 represents one or more front-end components of the chatbot that can be executed on a client device (e.g., desktop computer, laptop computer, smartphone, tablet) to enable receipt of user requests (e.g., queries) and providing responses.

In further detail, the RAI module 102 includes an input/output (I/O) moderation sub-module 120, an AI principles sub-module 122, and an AI moderation sub-module 124. The decision engine 104 includes a Generative Artificial Intelligence (GAI) selection module 130, a conversation management module 132, a query refiner module 134, an intent resolver module 136, a query classifier module 138, a search results ranking module 140, an output verification module 142, and an output formatter module 144. The conversational commerce module 106 includes a LLM chat module 150, a product recommendation sub-module 152, a personalized response sub-module 154, an event-centric search sub-module 156, a shopping cart integration sub-module 158, a real-time conversations sub-module 160, a multi-channel support sub-module 162, and a multi-model support sub-module 164.

The data ingestion system 108 includes a data processing module 170 and a database 172. The data processing module 170 includes a data extraction sub-module 174, a data cleaning sub-module 176, a data integration sub-module 178, a data validation sub-module 180, a data transformation sub-module 182, and a metadata management sub-module 184. The database 172 stores data 186, embeddings 188, and metadata 190. As described in further detail herein, the data processing module 170 processes structured data 192 and unstructured data 194 to provide one or more of the data 186, the embeddings 188, and the metadata 190.

In the example of FIG. 1, the hosting infrastructure 110 hosts one or more models 196. Example models 196 include, but are not limited to, foundation models, such as LLMs. The hosting infrastructure 110 represents the technical infrastructure(s), in which the foundation models are hosted. Example infrastructures include cloud computing platforms (e.g., Amazon Web Services (AWS), Google Cloud). In general, the foundation models can be provided by one or more third-parties, and can receive requests from (e.g., prompts through an API) and provide responses to the conversational commerce optimizer of the present disclosure.

In further detail, the user 118 can provide user input through the UI/UX module 112. For example, the UI/UX module 112 provides an interface for a chatbot that is optimized using the conversational commerce optimization system of the present disclosure. In some examples, the user input can include a query that is provided in natural language. For example, and in the context of e-commerce, an example query can include "I need summer clothing." As another example, an example query can include "I am going to my sister's wedding in a tropical country and need an outfit for the rehearsal dinner and for the wedding itself."

In some examples, the user input is processed through the RAI module 102 to ensure that the user input conforms to one or more RAI parameters. For example, the user input can be processed to ensure that the user input conforms to organization-specific AI principles. For example, the e-commerce retailer can define parameters for AI principles to ensure that user input and responses to user input conform to one or more AI principles (e.g., no obscene requests). To illustrate this, in general, users can provide whatever input they would like to a chatbot. When user input is received, the RAI module 102 processes (e.g., using the I/O moderation sub-module 120) the user input to ensure that the user input conforms to AI principles defined by the enterprise through the AI principles sub-module 122. In some examples, AI principles can be represented in allowed and/or disallowed terminology, intents, and the like. For example, user input can be processed to determine one or more intents and words and/or sentences that represent content that is prohibited according to AI principles instituted by the enterprise. For example, content that is reflective of hate speech, self-harm, threats, sexual content, violence, and the like (or any customized content where the enterprise seeks to control the entire intent or domain related to their specific use case) can be prohibited. As one example, if a user attempts to purchase a product that could be used for promoting or engaging in violence, the RAI module 102 will identify the intent and prevent processing of the user input. As another example, if an e-commerce retailer wishes to manage the intent of responses generated by GAI, they can apply organization-specific AI principles or can choose to use an open-source moderation API.

In some implementations, the GAI selection module 130 selects a suitable LLM for a given query to optimize for performance (e.g., latency) and cost (e.g., in terms of technical resources). In some examples, the GAI selection module 130 uses a multi-objective optimization algorithm that balances performance, cost, and accuracy to strategically select the most suitable LLM for a given task responsive to a query (e.g., user input). This ensures optimal resource utilization and maximizes the benefits of AI-driven conversational commerce. In some examples, the GAI selection module 130 includes a caching system that stores responses, reducing the need for repetitive LLM calls. This not only results in cost savings, but also avoids overreliance on any single LLM, enhancing resilience and independence. In some examples, the LLM can be selected based on query complexity and performance requirements. In case of complicated queries (e.g., queries that include intent classification) a LLM that is identified as the most-capable LLM for the given task is selected. As another example, for less complex queries (e.g., queries for summarization or query refinement), a less powerful, medium-sized LLM can be selected. In this manner, the most accurate results can be returned at low cost and latency without compromising on performance.

In some implementations, the conversation management module 132 records every interaction with the user 118 and leverages the interaction data to provide meaningful context to LLMs that are queried. This interaction data, also referred to as historic conversational data, can be used to improve accuracy of recommendations and maintain continuity of user interactions. In some examples, the conversation management module 132 enables leveraging of attention mechanisms within LLMs to maintain conversational context. By weighting relevant parts of previous interactions, contextually appropriate responses and recommendations can be provided. In some implementations, the query refiner module 134 processes the user input to correct any errors (e.g., spelling, grammar) and/or to clarify any ambiguities in the user input. In some examples, the query refiner module 134 provides a refined query based on the user input. For example, the query refiner module 134 can prompt a LLM to provide a refined query, the prompt including the user input and a request to improve the user input, and in response, the LLM provides the refined query. In this manner, a precision of the user input is provided without requesting that the user 118 themselves clarify the user input, avoiding time- and resource-intensive back-and-forth with the user 118.

In some implementations, the intent resolver module 136 processes the query (e.g., refined query) to determine one or more intents represented in the query. More particularly, the intent resolver module 136 interprets queries that may be indirect and/or abstract, such as those pertaining to occasions, events, and/or locations. As described in further detail herein, the intent(s) can be mapped to relevant products or services to ensure that responses returned to the user 118 are relevant and align with their actual needs. For example, and with reference to the example query "I am going to my sister's wedding in the Maldives and need an outfit for the rehearsal dinner and for the wedding itself," intents can include, without limitation, clothing purchase, formal clothing, informal clothing, wedding participation, clothing for tropical climate, and the like. Here, and as described in further detail herein, a response returned can include products that are appropriate for identified events and locations. In some examples, the intent resolver module 136 can provide the query as input to an intent resolution model (e.g., a ML model) that returns a set of intents for the query.

In some implementations, the query classifier module 138 analyzes the user input and categorizes the user input into a set of categories, each category being specific to an enterprise, such as the e-commerce retailer that the user 118 is interacting with. In some examples, each category is associated with a pre-defined workflow that governs how the user input is further processed. For example, the query classifier module 138 can process the user input to determine intent of the user in providing the user input. The intent can be further leveraged or utilized for integrating various workflows, such as product recommendations, identifying color preferences and room types, and answering questions related to e-commerce. For example, if the user asks about painting a wall, the query classifier module 138 will discern a color preference of the user and the type of room, initiating the product recommendation workflow and utilizing all predefined information to provide customized products. In instances where user preferences are used, use of the user preferences is premised on the explicit consent of users.

In some implementations, and as described in further detail herein, a search is performed based on the user input to identify, in the example context of e-commerce, products that may be relevant to the user input. For example, the search can be performed by comparing a set of user input embeddings to the embeddings 188 (e.g., using cosine similarity) to provide search results. Although not depicted in FIG. 1, an embedder can be provided (e.g., a pre-trained ML model) that processes the user input to return the set of user input embeddings. Here, an embedding can be described as a multi-dimensional vector that represents a product, for example, available through the e-commerce platform. In some examples, the search results include products having a threshold similarity to the user input (e.g., products having a cosine similarity score that exceeds a threshold cosine similarity score). In some examples, the search results ranking module 140 orders search results based on relevance to the user input (e.g., using cosine similarity).

An initial ordering based on relevance can be refined based on additional criteria (e.g., customer priority, user ratings, and/or price) to ensure that the most pertinent search results are highlighted. In some implementations, a top X (e.g., top 5, top 10) search results are selected and are used as context for prompting a LLM (e.g., the LLM selected by the GAI selection module 130). For example, each search result can include data associated with the search result (e.g., product description data from the data 186), and the prompt to the LLM can include the search results as examples that the response of the LLM is to be constrained to. With non-limiting reference to the example user input of "I am going to my sister's wedding in the Maldives and need an outfit for the rehearsal dinner and for the wedding itself," an example prompt to a LLM can include "Select clothes that are appropriate for a rehearsal dinner and clothes that are appropriate for a wedding in a tropical climate; Please return a response based on the following products [search results]," where [search results] includes data descriptive of products in the top X search results.

In some implementations, the output verification module 142 mitigates potential for LLMs to produce erroneous and/or inaccurate outputs by checking LLM responses for factual accuracy and relevance. In this manner, the output verification module 142 functions as a quality control agent, ensuring that the information provided meets standards for reliability. For example, the output verification module 142 checks for the answer relevance, context relevance and groundedness of the output. In some examples, the output verification module 142 verifies citation uniform resource locators (URLs) whenever applicable. In the example case of product recommendation, the output verification module 142 checks for accuracy of the product details to be presented to the user by comparing the output to groundtruth data for the product.

In some implementations, the output formatter module 144 converts the output of the LLMs into an appropriate format for return through the UI/UX module 112. Example formats can include, but are not limited to, Javascript object notation (JSON), hypertext mark-up language (HTML), and extensible markup language (XML). In some examples, conversion is performed using template-based rendering. For example, the output of the LLM is a text string. However, the objective is to integrate the output with the UI. This necessitates converting the LLM output into a specific format tailored to the UI requirements. To ensure compatibility, a layer of libraries that manage the format of the LLM output is implemented by the UI/UX module 112 to facilitate smooth integration. The output formatter module 144 ensures seamless integration with various front-ends by dynamically adapting the AI-generated content to the specifications required for various platforms and devices, facilitating a smooth user experience and interoperability across different systems.

Turning to the conversational commerce module 106, the LLM chat module 150 interacts with one or more of the LLMs (e.g., the LLM selected by the GAI selection module 130). In some examples, the LLM chat module 150 constructs a prompt using the query (e.g., the refined query) and the context (e.g., the top X search results). Here, the prompt is provided as a RAG prompt, in which the context informs and constrains the response that is returned by the LLM. In some examples, the LLM chat module 150 submits a request to and receives a response from the LLM (e.g., through an application programming interface (API)).

The product recommendation sub-module 152 can perform a search of the database 172 to identify the set of search results that are responsive to the user input. For example, and as discussed above, the search can be performed by comparing a set of user input embeddings to the embeddings 188 (e.g., using cosine similarity) to provide search results. In some examples, the search results include products having a threshold similarity to the user input (e.g., products having a cosine similarity score that exceeds a threshold cosine similarity score). In some examples, the product recommendation sub-module 152 provides initial search results to the search results ranking module 140, which determines a set of search results to use as context for the prompt to the LLM, as described in detail herein.

The personalized response sub-module 154 can be used to further define search results to be used as context for the prompt based on conversation history, for example. The event-centric search sub-module 156 can be used to further define search results to be used as context for the prompt based on one or more events (e.g., rehearsal dinner, wedding).

The shopping cart integration sub-module 158 enables integration with a shopping cart system of, for example, the e-commerce platform. For example, search results can be selected by the user 118 and can be added to a shopping cart of the user 118 for subsequent purchase.

The real-time conversations sub-module 160 records interactions with the user 118. For example, the real-time conversations sub-module 160 records user input received from the user 118 and output of the LLM(s) responsive to the user input. In some examples, the real-time conversations sub-module 160 records additional parameters, such as intents and/or events determined from user input. In this manner, the real-time conversations sub-module 160 can be used to maintain continuity across multiple interactions with the user 118. For example, for a first user input, a first set of intents can be determined and used for provisioning of a first response from an LLM. For a second user input, a second set of intents can be determined and can be combined with the first set of intents (e.g., removing duplicate intents) to provide a combined set of intents that can be used for provisioning a second response from the LLM. As another example, for a first user input, a first set of intents can be determined and used for provisioning of a first response from a first LLM. For a second user input, a second LLM is selected and a second set of intents can be determined. The second set of intents can be combined with the first set of intents (e.g., removing duplicate intents) to provide a combined set of intents that can be used for provisioning a second response from the second LLM. Here, the first response from the first LLM can be used as at least a portion of context included with the prompt to the second LLM.

The multi-channel support sub-module 162 enables support of multiple channels of communication with the user 118. Example channels can include a website, an application, social media, and the like (e.g., communicating with the user 118 through a social media website, communicating with the user 118 through a social media mobile application). The multi-model support sub-module 164 enables interactions with disparate types of GAI models, such as GAI models with different modalities. For example, the multi-model support sub-module 164 enables interactions with text-to-text GAI models (e.g., LLMs), text-to-image GAI models, text-to-audio GAI models, and the like.

Turning to the data ingestion system 108, the data extraction sub-module 174 extracts data from the structured data 192 and/or the unstructured data 194. In some examples, the structured data 192 includes tabular data stored in, for example, a relational management database (RMDB), where data is stored in tables (e.g., columns, rows) and multiple tables have relational links. In some examples, the unstructured data 194 includes data provided in images, video, product brochures, marketing materials, and the like. The data cleaning sub-module 176, the data integration sub-module 178, the data validation sub-module 180, the data transformation sub-module 182, and the metadata management sub-module 184 further process the extracted data for storage within the database 172, as the data 186. In some examples, embeddings are generated for the data 186 and are stored in the database 172 as the embeddings 188. Although not depicted in FIG. 1, an embedder can be provided (e.g., a pre-trained ML model) that processes the data 186 to return the embeddings 188. In some examples, the embedder that is used to generate the user input embeddings, described above, is the same embedder used to generate the embeddings 188.

Figure 2:
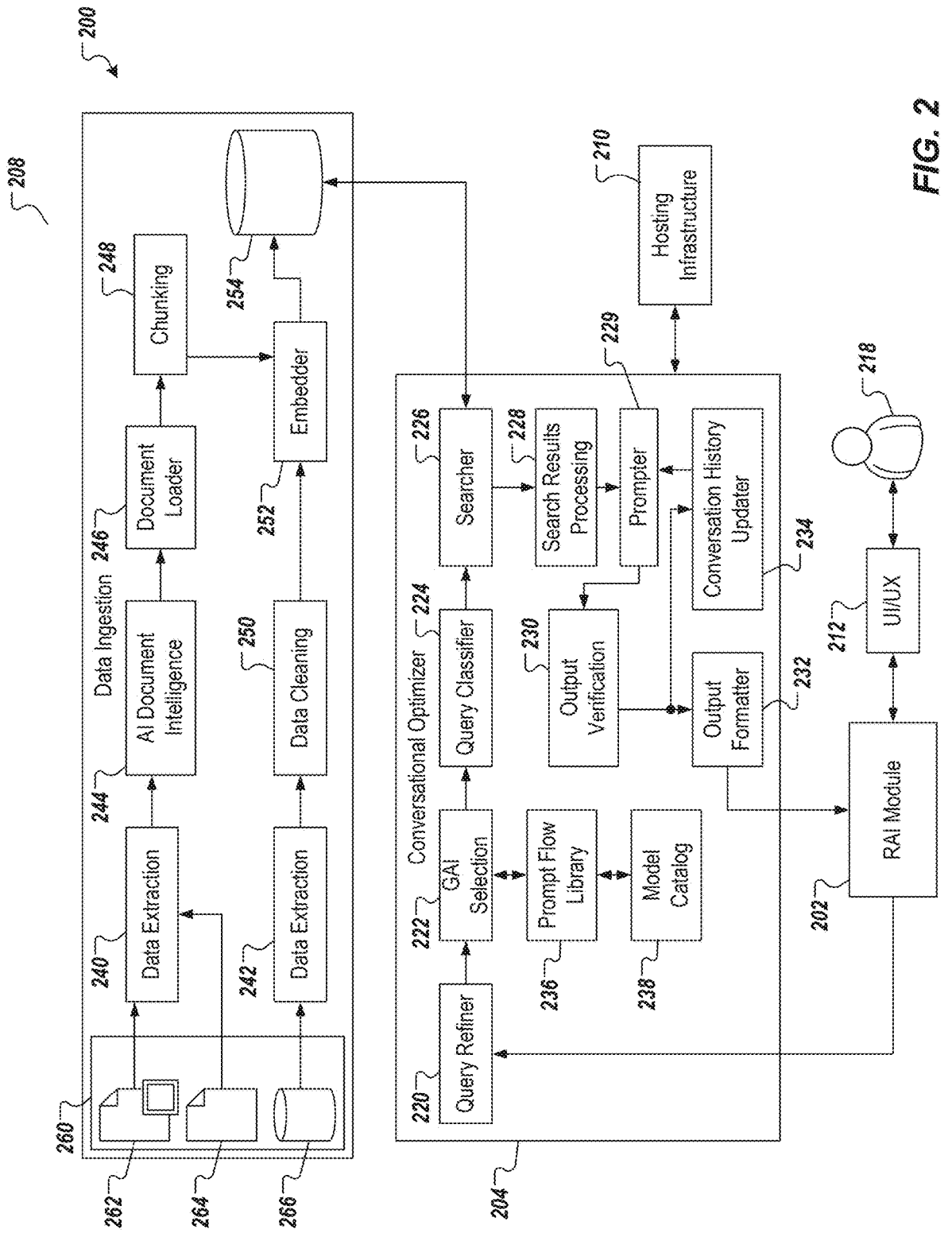
FIG. 2 depicts an example architecture for a use case of a virtual assistant in accordance with implementations of the present disclosure.

FIG. 2 depicts an example architecture 200 for a virtual assistant in accordance with implementations of the present disclosure. The example use case includes an enterprise that provides an online shopping platform (e.g., e-commerce website), through which users can purchase products. The online shopping platform includes a chatbot that leverages the conversational commerce optimizer of the present disclosure.

In the example of FIG. 2, the example architecture 200 includes a RAI module 202, a conversational optimizer system 204, a data ingestion system 208, a hosting infrastructure 210, and a UI/UX module 212. The UI/UX module 212 represents one or more interfaces, through which a user 218 can interact with a chatbot that leverages the conversational commerce optimizer of the present disclosure. For example, the UI/UX module 212 represents one or more front-end components of the chatbot that can be executed on a client device (e.g., desktop computer, laptop computer, smartphone, tablet) to enable receipt of user requests (e.g., queries) and to provide responses.

In the example of FIG. 2, the conversational optimizer system 204 includes a query refiner module 220, a GAI selection module 222, a query classifier module 224, a searcher module 226, a search results processing module 228, a prompter module 229, an output verification module 230, an output formatter module 232, a conversational history updater module 234, a prompt flow library 236, and a model catalog 238. The data ingestion system 208 includes data extraction modules 240, 242, an AI document intelligence module 244, a document loader module 246, a chunking module 248, a data cleaning module 250, an embedder 252, and a database 254. As described herein, the data ingestion system 208 processes data sources 260 that can include text+image data 262, text data 264, and product data 266. Here, the text+image data 262 and the text data 264 represent unstructured data, and the product data 266 represents structured data (e.g., a product database).

The example architecture 200 of FIG. 2 represents an example use case including tailoring of components of the conversational commerce optimizer system for the use case. That is, not all components represented in the example architecture 100 of FIG. 1 are implemented in the architecture 200 of FIG. 2.

In the example use case, the data sources 260 provide data representative of products that can be purchased by users, such as the user 218, through the online shopping platform. For example, the text+image data 262 and the text data 264 can include materials, such as product brochures, marketing documents, images, video, and the like related to products that are available through the e-commerce platform. As another example, the product data 266 can be data representative of the products and stored in a structured format, such as in a product database (e.g., a relational database).

The data extraction module 240 processes the text+image data 262 and the text data 264 to extract data therefrom. For example, the data extraction module 240 can use optical character recognition (OCR) to extract text and/or image recognition to extract images from documents (e.g., portable document format (PDF) documents). In some examples, the AI document intelligence module 244 can apply ML to process extracted data and generate, for example, key-value pairs, tables, and structures, turning the unstructured data into usable data. In some examples, the document loader module 246 and the chunking module 248 operate to provide chunks from each of the unstructured data 262, 264. Here, a chunk can be described as a segment of text having limited size (e.g., character length). In some examples, the document loader module 246 and the chunking module 248 can be provided using LangChain. The chunks are processed through the embedder 252 to generate a set of embeddings that are stored in the database 254. The data extraction module 242 extracts data from the product data 266. The data cleaning module 250 processes the extracted data to perform one or more clean-up operations. Example data cleaning can include, without limitation, addressing special characters and punctuation, abbreviations, and acronyms, requiring handling and lowercasing. This ensures consistency when creating embedding vectors. The extracted data is processed through the embedder 252 to generate a set of embeddings that are stored in the database 254.

In accordance with implementations of the present disclosure, user input is received through the UI/UX module 212 and is provided to the query refiner 220. In some examples, the user input is provided after passing through the RAI module 202, which can implement one or more RAI restrictions. For example, the RAI module 202 can review the user input for compliance with one or more RAI restrictions and, if determined to be in compliance, the RAI module 202 forwards the user input. In some examples, the query refiner 220 processes the user input to provide a refined query. For example, the query refiner 220 can prompt a LLM to provide a refined query, where the LLM can correct spelling and/or grammatical errors in the user input. In some examples, the user input is refined based on previous user input provided from the user 218. For example, a last Z (e.g., last 2) inputs received from the user 218 can be retrieved from the database 252 and can be used as context for refining the user input to provide the refined query. For example, the query refiner 220 can generate a prompt (e.g., using a prompt template) that includes the user input and the last Z inputs, where the prompt requests that the LLM generate a refined query based on the user input and the last Z inputs. In this manner, the refined query accounts for context of an ongoing conversation that the user 218 is having with the chatbot.

In some implementations, the GAI selection module 222 selects a LLM that will be used to provide a response to the refined query. For example, the GAI selection module 222 can select an LLM based on minimizing latency and/or cost for querying the LLM. In some examples, selection of the LLM is based on information provided in the prompt flow library 236 and the model catalog 238. In some examples, the prompt flow library 326 is provide as a routine developed in Python to facilitate LLM selection. It encapsulates all of the required code to enable connection to any LLM across the ecosystem. In some examples, the prompt flow library 326 supports OpenAI and Google LLM integration out-of-the-box and support can be added for any new LLM. In more general terms, the prompt flow library 236 provides for LLM agnosticism. Depending on the predefined criteria, the prompt flow library 236 selects the LLM to best answer the input query. This criteria is part of configurations and can be changed any time.

In some implementations, the query classifier module 224 processes the refined query to determine a class (category) that the query is assigned to. In some examples, the query classifier module 224 prompts a ML model, such as an LLM, to process the refined query and identify the class that the query is assigned to.

In some implementations, the searcher module 226 queries the database 254 for product data that is relevant to the refined query and that can be used as context for prompting the LLM (e.g., the LLM selected by the GAI selection module 222). In some examples, the refined query is processed through an embedder (e.g., the same embedder as the embedder 252) to generate a set of user input embeddings, as described herein. In some examples, the database 254 is queried using the set of user input embeddings. For example, the user input embeddings are compared to embeddings stored in the database 254 and initial search results are determined based on comparing (e.g., determining cosine difference as described herein). In some examples, the initial search results include products that are determined to be relevant to the refined query. In some examples, the search results processing module 228 processes the initial search results to determine search results (e.g., a top X search results) that are to be used, as described herein.

In some implementations, the prompter module 229 prompts the LLM (e.g., the LLM selected by the GAI selection module 222) using the refined query and the search results (e.g., the top X search results). For example, the prompter module 229 can generate a prompt using the refined query and the search results. In some examples, the prompt is generated using a prompt template, where place-holders in the prompt template are replaced by at least a portion of the refined query. In some examples, the search results are provided in the prompt as context for the LLM to provide a response. In some examples, the prompt can include conversational history context. For example, the conversation history updater module 234 can provide at least a portion of a historical conversation that the user 218 has had with the chatbot (e.g., the last Y refined queries and LLM responses), which can be used by the prompter module 229 as conversational history context for the prompt that is to be sent to the LLM. Here, the prompt can include at least a portion of the refined query, the search results, and the conversational history context. In some examples, for each prompt and response, the conversation history updater module 234 records the prompt-response pair in the database 254 and can retrieve the at least a portion of a historical conversation from the database 254 for subsequent prompts.

In some implementations, the prompter module 229 prompts the LLM by transmitting the prompt to the LLM executing in the hosting infrastructure 210 (e.g., through an API). The LLM processes the prompt and provides output as a returned response to the prompt. In some examples, the prompter 229 provides the output to the output verification module 230, which verifies the output of the LLM. For example, and as described herein, the output verification module 230 verifies an accuracy of the output and/or that the output is absent misinformation. In some examples, the output formatter module 232 converts output into an appro-priate format (e.g., JSON, HTML, XML) for return through the UI/UX module 212, as described herein.

Figure 3:
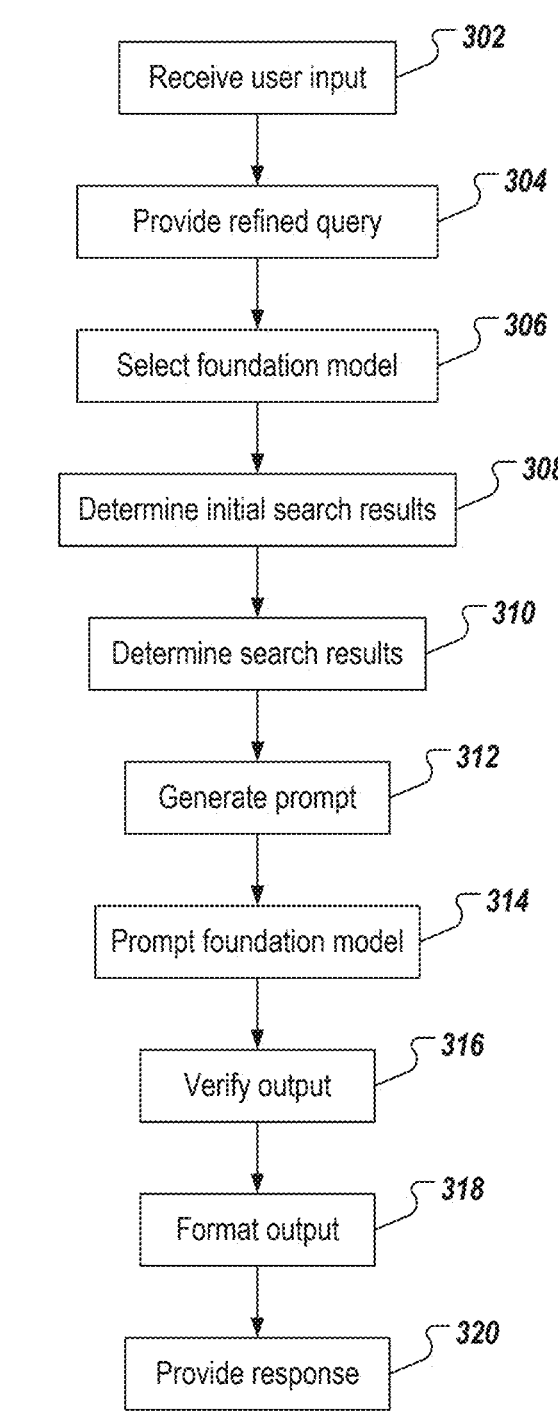
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices. At least a portion of the example process 300 can be executed by a conversational commerce optimizer system of the present disclosure to facilitate and improve interactions between users and chatbots.

User input is received (302). For example, and as described herein with reference to FIG. 2, user input of the user 218 is received through the UI/UX module 212 and is provided to the query refiner 220 (e.g., after passing through the RAI module 202, which can implement one or more RAI restrictions). In the context of the present disclosure, the user 218 is interacting with a chatbot of an e-commerce platform (e.g., to search for goods and/or services offered through the e-commerce platform). Here, the UI/UX module 212 provides one or more front-end components that enable inter-actions between the user 218 and the chatbot.

A refined query is provided (304). For example, and as described herein, the query refiner 220 processes the user input to provide a refined query. In some examples, the query refiner 220 can prompt a LLM to provide a refined query, where the LLM can correct spelling and/or gram-matical errors in the user input. In some examples, the prompt can include a last Z inputs (e.g., last 2 inputs) received from the user 218, such that the refined query accounts for previous user input. A foundation model is selected (306). For example, and as described herein, the GAI selection module 222 (e.g., Frugal GPT) selects a LLM that will be used to provide a response to the refined query. For example, the GAI selection module 222 can select an LLM based on minimizing latency and/or cost for querying the LLM.

Initial search results are determined (308). For example, and as described herein, the searcher module 226 queries the database 254 for initial search results (product data) that are relevant to the refined query. In some examples, a set of user input embeddings is used to query the database 254, where user input embeddings are compared to embeddings stored in the database 254 and initial search results are determined based on comparing (e.g., determining cosine difference as described herein). In some examples, the initial search results include products that are determined to be relevant to the refined query. Search results are determined (310). For example, and as described herein, the search results pro-cessing module 228 processes the initial search results to determine search results (e.g., a top X search results) that are to be used.

A prompt is generated (312). For example, and as described herein, the prompter module 229 prompts the LLM (e.g., the LLM selected by the GAI selection module 222) using the refined query and the search results (e.g., the top X search results). In some examples, the prompter module 229 generates the prompt using a prompt template, where placeholders in the prompt template are replaced by at least a portion of the refined query. In some examples, the prompt can include conversational history context represen-tative of an ongoing conversation between the user 218 and the chatbot.

The foundation model is prompted (314). For example, and as described herein, the prompter module 229 prompts the LLM by transmitting the prompt to the LLM executing in the hosting infrastructure 210 (e.g., through an API). The LLM processes the prompt and provides output as a returned response to the prompt. The output is verified (316) and the output is formatted (318). For example, and as described herein, the output verification module 230 verifies an accu-racy of the output and/or that the output is absent misinfor-mation and the output formatter module 232 converts output into an appropriate format (e.g., JSON, HTML, XML) for return through the UI/UX module 212, as described herein. A response is provided (320). For example, and as described herein, the output is returned as a response to the user input through the UI/UX module 212.

Implementations of the present disclosure provide mul-tiple technical improvements and address drawbacks of traditional chatbots and integration of GAI, such as those discussed herein. For example, implementations of the pres-ent disclosure mitigate inaccurate information, biased infor-mation, and misinformation (e.g., so-called hallucinations that can plague LLMs) by detection and correction of any implausible or nonsensical information generated to ensure reliable information is provided to users. Implementations of the present disclosure also provide predictable outputs through calibration to deliver consistent results that align with expected outcomes, reducing unexpected interactions with users. This includes consistency in responses by maintaining a uniform response structure and preserving the conversational context. Implementations of the present disclosure also provide for efficiencies in terms of technical resource consumption, which also includes minimizing latency (even under heavy loads). Implementations of the present disclosure also enable tailored control enabling bespoke customization and fine-tuning behavior of foundation models to specific needs and preferences. Implementations of the present disclosure also provide flexibility in integration of foundation models into existing workflows and software systems (e.g., customer relationship management (CRM) systems, enterprise resource planning (ERP) systems). This includes, for example, handling structured data and unstructured data and seamless connection with existing databases, file systems, and the like to enable unified processes. Implementations of the present disclosure also enhance scalability to scale in response to demand without compromising quality or performance.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for facilitating interactions between a user and a chatbot of an electronic commerce (e-commerce) platform, the method comprising:

receiving, by a query refiner of a conversational commerce optimizer system, a first user input from a user, the first user input being provided during a chat session through a user interface of the chatbot of the e-commerce platform;

providing, by the query refiner, a first refined query based on the first user input;

selecting, by a Generative Artificial Intelligence (GAI) selection module of the conversational commerce optimizer system, a first foundation model that is to be queried using the first refined query;

determining, by the query refiner, a first set of search results from a database that stores data representative of products available through the e-commerce platform;

prompting the first foundation model using a first prompt that is generated based on the first refined query and the first set of search results, the first foundation model providing a first output responsive to the first prompt;

providing a first response to the user through the user interface of the chatbot, the first response being generated based on the first output;

receiving, by the query refiner, a second user input from the user;

providing, by the query refiner, a second refined query based on the second user input;

selecting, by the GAI selection module, a second foundation model that is to be queried using the second refined query;

prompting the second foundation model using a second prompt that is generated based on the second refined query, the second foundation model providing a second output responsive to the second prompt; and providing a second response to the user though the user interface of the chatbot, the second response being generated based on the second output.

2. The computer-implemented method of claim 1, wherein the first response is provided by validating the first output and formatting the first output.

3. The computer-implemented method of claim 1, wherein the first set of search results is generated by comparing a set of user input embeddings to embeddings stored in the database.

4. The computer-implemented method of claim 1, wherein the first set of search results is provided from an initial set of search results determined based on the first refined query.

5. The computer-implemented method of claim 1, herein the second refined query is provided at least partially based on the first user input.

6. The computer-implemented method of claim 1, wherein the second prompt is provided at least partially based on the first user input and the first output.

7. A system, comprising:

one or more processors; and a computer-readable storage device coupled to the one or more processors and having instructions stored thereon which, when executed by the one or more processors, cause the one or more processors to perform operations for facilitating interactions between a user and a chatbot of an electronic commerce (e-commerce) platform, the operations comprising:

receiving, by a query refiner of a conversational commerce optimizer system, a first user input from a user, the first user input being provided during a chat session through a user interface of the chatbot of the e-commerce platform;

providing, by the query refiner, a first refined query based on the first user input;

selecting, by a Generative Artificial Intelligence (GAI) selection module of the conversational commerce optimizer system, a first foundation model that is to be queried using the first refined query;

determining, by the query refiner, a first set of search results from a database that stores data representative of products available through the e-commerce platform;

prompting the first foundation model using a first prompt that is generated based on the first refined query and the first set of search results, the first foundation model providing a first output responsive to the first prompt;

providing a first response to the user through the user interface of the chatbot, the first response being generated based on the first output;

receiving, by the query refiner, a second user input from the user;

providing, by the query refiner, a second refined query based on the second user input;

selecting, by the GAI selection module, a second foundation model that is to be queried using the second refined query;

prompting the second foundation model using a second prompt that is generated based on the second refined query, the second foundation model providing a second output responsive to the second prompt; and providing a second response to the user though the user interface of the chatbot, the second response being generated based on the second output.

8. The system of claim 7, wherein the first response is provided by validating the first output and formatting the first output.

9. The system of claim 7, wherein the first set of search results is generated by comparing a set of user input embeddings to embeddings stored in the database.

10. The system of claim 7, wherein the first set of search results is provided from an initial set of search results determined based on the first refined query.

11. The system of claim 7, wherein the second refined query is provided at least partially based on the first user input.

12. The system of claim 7, wherein the second prompt is provided at least partially based on the first user input and the first output.

13. Computer-readable storage media coupled to the one or more processors and having instructions stored thereon which, when executed by the one or more processors, cause the one or more processors to perform operations for facilitating interactions between a user and a chatbot of an electronic commerce (e-commerce) platform, the operations comprising:

receiving, by a query refiner of a conversational commerce optimizer system, a first user input from a user, the first user input being provided during a chat session through a user interface of the chatbot of the e-commerce platform;

providing, by the query refiner, a first refined query based on the first user input;

selecting, by a Generative Artificial Intelligence (GAI) selection module of the conversational commerce optimizer system, a first foundation model that is to be queried using the first refined query;

determining, by the query refiner, a first set of search results from a database that stores data representative of products available through the e-commerce platform;

prompting the first foundation model using a first prompt that is generated based on the first refined query and the first set of search results, the first foundation model providing a first output responsive to the first prompt;

providing a first response to the user through the user interface of the chatbot, the first response being generated based on the first output;

receiving, by the query refiner, a second user input from the user;

providing, by the query refiner, a second refined query based on the second user input;

selecting, by the GAI selection module, a second foundation model that is to be queried using the second refined query;

prompting the second foundation model using a second prompt that is generated based on the second refined query, the second foundation model providing a second output responsive to the second prompt; and providing a second response to the user though the user interface of the chatbot, the second response being generated based on the second output.

14. The computer-readable storage media of claim 13, wherein the first response is provided by validating the first output and formatting the first output.

15. The computer-readable storage media of claim 13, wherein the first set of search results is generated by comparing a set of user input embeddings to embeddings stored in the database.

16. The computer-readable storage media of claim 13, wherein the first set of search results is provided from an initial set of search results determined based on the first refined query.

17. The computer-readable storage media of claim 13, wherein the second refined query is provided at least partially based on the first user input.

* * * * *